(12) United States Patent
Van Belkom

(10) Patent No.: US 10,443,762 B2
(45) Date of Patent: Oct. 15, 2019

(54) BEND RESTRICTION ELEMENT FOR RESTRICTING THE BENDING RANGE OF A CONDUIT

(71) Applicant: LANKHORST ENGINEERED PRODUCTS B.V., AD Sneek (NL)

(72) Inventor: Arnoldus Van Belkom, Spannum (NL)

(73) Assignee: LANKHORST ENGINEERED PRODUCTS B.V., Sneek (NL)

( * ) Notice: Subject to any disclaimer, the term of this patent is extended or adjusted under 35 U.S.C. 154(b) by 977 days.

(21) Appl. No.: 14/371,560

(22) PCT Filed: Jan. 9, 2013

(86) PCT No.: PCT/NL2013/050010
§ 371 (c)(1),
(2) Date: Jul. 10, 2014

(87) PCT Pub. No.: WO2013/105853
PCT Pub. Date: Jul. 18, 2013

(65) Prior Publication Data
US 2014/0377010 A1    Dec. 25, 2014

(30) Foreign Application Priority Data
Jan. 10, 2012    (NL) ..................................... 2008092

(51) Int. Cl.
*F16L 27/02*    (2006.01)
*F16L 1/20*    (2006.01)
(Continued)

(52) U.S. Cl.
CPC ................. *F16L 1/20* (2013.01); *F16L 1/123* (2013.01); *F16L 27/02* (2013.01); *F16L 57/02* (2013.01); *H02G 3/0475* (2013.01)

(58) Field of Classification Search
CPC ............ F16L 1/20; F16L 27/02; E21B 17/017
(Continued)

(56) References Cited

U.S. PATENT DOCUMENTS

| 428,023 | A | * | 5/1890 | Schoff | ..................... F16M 11/40 |
| | | | | | 138/120 |
| 5,197,767 | A | * | 3/1993 | Kimura | ..................... F16G 13/10 |
| | | | | | 138/120 |

(Continued)

FOREIGN PATENT DOCUMENTS

| EP | 1 213 522 A1 | 6/2002 |
| GB | 2 413 219 A | 10/2005 |

(Continued)

*Primary Examiner* — Anna M Momper
*Assistant Examiner* — Fannie C Kee
(74) *Attorney, Agent, or Firm* — Pearne & Gordon LLP

(57) ABSTRACT

A bend restriction element (1) is modular for forming a tube segment (12) all around a conduit through locked interlocking circumferential interconnection of multiple similar such elements (1). The tube segment (12) is modular for forming an articulated tube (100) around the conduit through locked interlocking longitudinal interconnection of multiple similar such tube segments (12). The locking of the circumferential interconnection of the elements (1) is ensured both by the manner of interlocking of a tube segment concerned (12) with a tube segment (16) situated on one side thereof, and by the manner of interlocking of the tube segment concerned (12) with a tube segment (14) situated on the other side thereof.

5 Claims, 8 Drawing Sheets

(51) Int. Cl.
  *F16L 57/02* (2006.01)
  *F16L 1/12* (2006.01)
  *H02G 3/04* (2006.01)

(58) Field of Classification Search
  USPC .......... 285/146.1, 147.1, 330, 913, 114–116
  See application file for complete search history.

(56) References Cited

U.S. PATENT DOCUMENTS

| | | | |
|---|---|---|---|
| 6,575,654 B2 * | 6/2003 | Wentworth | H02G 3/0468 138/120 |
| 6,629,651 B1 * | 10/2003 | Male | E03C 1/021 239/587.1 |
| 6,682,103 B1 | 1/2004 | Poirier | |
| 7,337,808 B2 * | 3/2008 | Shamir | E03C 1/0408 138/120 |
| 2007/0029081 A1 | 2/2007 | Shaw | |
| 2010/0228295 A1 | 9/2010 | Whitefield | |

FOREIGN PATENT DOCUMENTS

| | | |
|---|---|---|
| GB | 2 428 760 A | 2/2007 |
| WO | 01/24336 A1 | 4/2001 |
| WO | 2010/136801 A1 | 12/2010 |

* cited by examiner

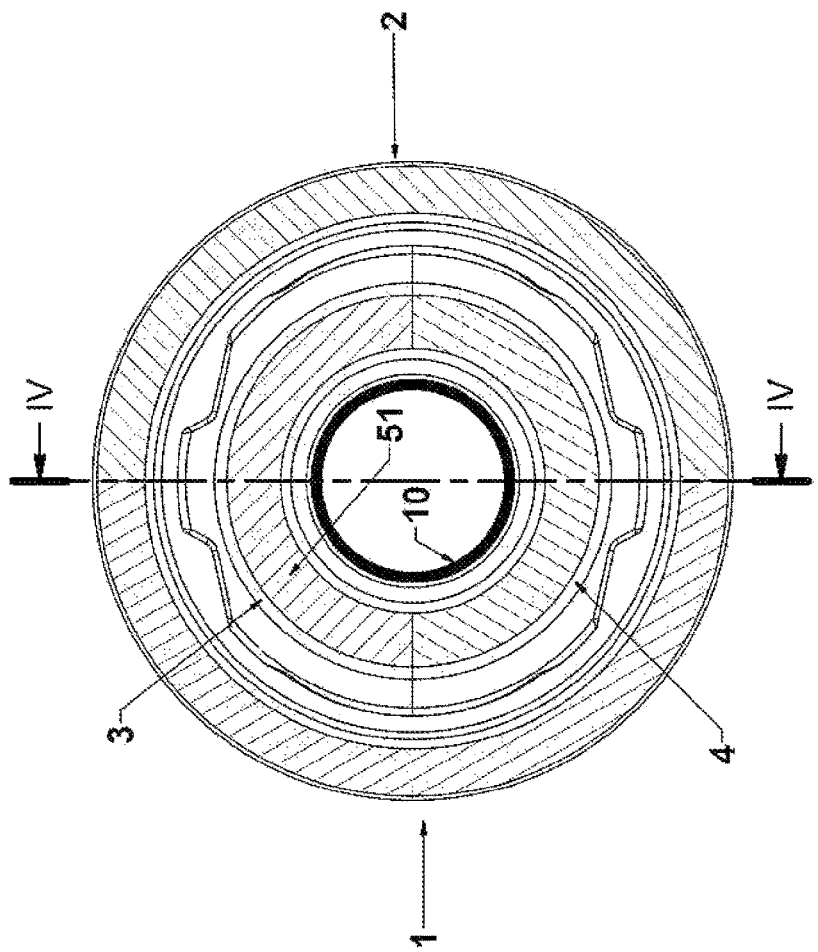

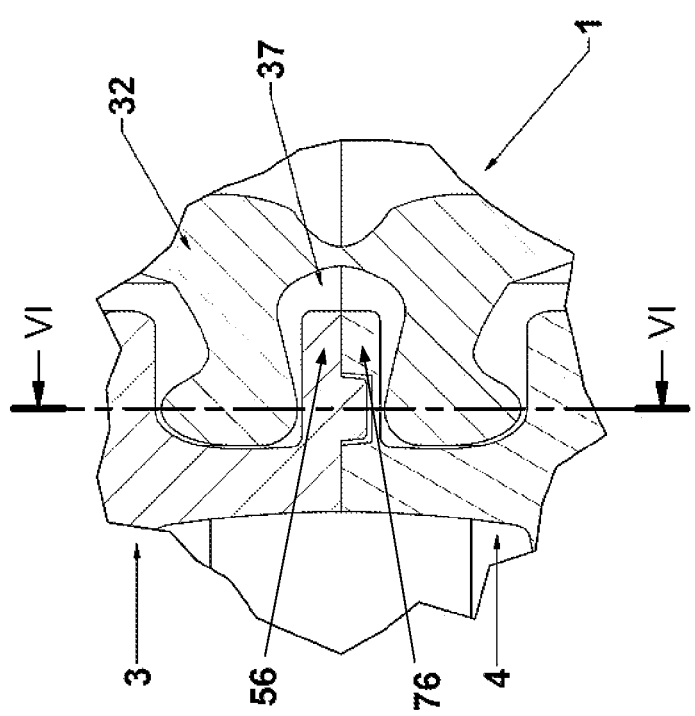

BEND RESTRICTION ELEMENT FOR RESTRICTING THE BENDING RANGE OF A CONDUIT

FIELD OF THE INVENTION

This invention relates to a bend restriction element, hereinafter also briefly referred to as "element", for restricting the bending range of a conduit, wherein the element is modular for forming a tube segment all around the conduit through locked interlocking circumferential interconnection, i.e., interconnection in a circumferential direction of the conduit, of the element with at least one similar such element, wherein the tube segment is modular for forming an articulated tube around the conduit through locked interlocking a longitudinal interconnection, i.e., interconnection in a longitudinal direction of the conduit, of the tube segment with at least one similar such tube segment, wherein tube segments of the articulated tube can hinge relative to each other about lines which are transverse to the longitudinal direction of the conduit, and wherein the hinging range of said hinging of the tube segments is restricted for said restricting of the bending range of the conduit.

DESCRIPTION OF RELATED ART

Such an articulated tube formed by such bend restriction elements is also referred to as 'bend restrictor'. Such an articulated tube, arranged all around a bendable conduit, such as, for example, an (underwater) pipeline, cable, or the like, prevents kinking, buckling, or other damage to the conduit. Bend restrictors are used, for example, in offshore. In most cases, bend restrictors are only arranged around the conduit portions that are most vulnerable in view of the above contingencies. Applied locally at such portions around a conduit, a bend restrictor thus restricts the local bending range of a conduit. The most vulnerable portions of conduits are often in the vicinity of places where the conduits concerned come out of a hard construction, such as an oil rig, and pass into the sea. In such cases, the bend restrictor is often fastened by one of its ends to the hard construction.

In their often long-lasting use, bend restrictors are generally continuously exposed to various great and strongly variable loads, and to the action of various elements of nature. The ambient conditions are generally rough and are determined, for example, by waves and currents of the sea, wind, displacement operations of the conduits, and unintended collisions of the conduit with external objects, such as vessels or other work equipment. The loads strongly varying in magnitude and all possible directions act on the bend restrictor not only from the outside but also from the inside, since the moving and bending conduit is located inside the tube-shaped bend restrictor. It is of great importance for a bend restrictor to be reliably resistant to all such loads. If a bend restrictor fails, the conduit no longer protected by the bend restrictor may kink, buckle, or sustain damage otherwise. This generally has disastrous consequences because the conduits to be protected often fulfil essential functions. Loss of those functions can entail far-reaching financial consequences and/or damage to company, economy or society and/or, for instance, lead to harm to the environment. Also, repair of conduits has far-reaching financial consequences.

A bend restriction element is known from WO2010/136801A1. This known element is shown in FIGS. 1, 2, and 3 of WO2010/136801A1, where two specimens of the known element are denoted with the respective reference numerals 3 and 5. In the passage of p. 10, line 27 to p. 11, line 22 of WO2010/136801A1 it is described how the bend restrictor is assembled on site with these elements 3 and 5. First, two elements 5 are fixed together by means of nuts and threaded bolts in apertures 4 of the elements 5. The two elements 5 fixed together then form a first tube segment of the bend restrictor. Next, two elements 3 are arranged by their female portions 11 around the male portions 10 of the elements 5, whereupon the two elements 3 are likewise fixed together by means of nuts and threaded bolts in apertures 4 of the elements 3. The two elements 3 fixed together then form a second tube segment of the bend restrictor.

A drawback of these elements known from WO2010/136801A1 is that fitting several nut/threaded bolt combinations per tube segment on site is labour intensive, and often troublesome as well, for instance, in rough ambient conditions underwater. Also, it is a drawback that the many nut/threaded bolt combinations account for a substantial part of the cost price of the thus obtained bend restrictor. In fact, the elements 3, 5 themselves can be manufactured from relatively inexpensive plastic material, for instance by moulding or injection moulding.

Another bend restriction element is known from WO01/24336A1. This known element is for instance shown in FIGS. 1 and 2 of WO01/24336A1, where identical specimens of the known element are denoted with reference numerals 13 and 13'. Two mutually fastened elements 13 and 13' form a tube segment 11 (right-hand side in FIG. 1 of WO01/24336A1). Two other mutually fastened elements 13 and 13' form another tube segment 11' (left-hand side in FIG. 1 of WO01/24336A1). Each tube segment has a first end 16 and a second end 15, the first end 16 of the tube segment concerned engaging around the second end 15 of an adjacent tube segment in a ball joint-like manner. Of each tube segment 11, 11', the two elements 13 and 13' are mutually retained at the first end 16 by means of shaft ends 18 and hook parts 20 of the two elements 13 and 13' proper (see FIG. 2 of WO01/24336A1), while the two elements 13 and 13' at the second end 15 are mutually held together by the first end 16 of the adjacent tube segment. Thus, in FIG. 1 of WO01/24336A1 the two elements 13 and 13' at the second end 15 of the tube segment 11 are mutually held together by the first end 16 of the adjacent tube segment 11'. An advantage of the elements known from WO01/24336A1 is that they hardly require any threaded bolts or the like. With the elements known from WO01/24336A1, nuts/threaded bolts only need to be applied at the last tube segment of a bend restrictor. For fitting such threaded bolts, the elements 13, 13' are provided with holes 26 (shown in FIGS. 2 and 3 of WO01/24336A1).

A drawback of these elements known from WO01/24336A1, however, is that not only the mutual fastenings of elements of a tube segment, but also the mutual fastenings of tube segments are vulnerable, as a result of which the reliability of the bend restrictor leaves to be desired. If, for instance, just one shaft end 18 or just one hook part 20 of just one element 13 or 13' of a bend restrictor being in operation breaks down, this element comes loose from its companion in the tube segment concerned. The result is then a chain reaction whereby tube segment after tube segment of the bend restrictor concerned comes loose and the bend restrictor is lost entirely. As a consequence, the conduit no longer protected by the bend restrictor may kink, buckle, or sustain damage otherwise, which, as mentioned, generally has disastrous results. Such adverse results can in principle be counteracted by making the mutual fastenings of elements of a tube segment of stronger and more durable design. This, however, increases the cost price of the elements. It could also be chosen to use nuts and threaded bolts at all the tube segments of a bend restrictor, instead of only at the last tube segment of a bend restrictor. However, as has already been mentioned above for the elements known from WO2010/136801A1, the many nuts and threaded bolts increase the cost price of the bend restrictor, and fitting the many nuts and threaded bolts on site is labour intensive and often troublesome.

It is an object of the invention to provide a bend restriction element with which an articulated tube for restricting the bending range of a conduit can be formed, which articulated tube is reliable, easy to install, and has a favourable ratio between quality and cost price.

SUMMARY OF THE INVENTION

To this end, a bend restriction element of the above initially indicated kind is characterized in that the element is configured such that the locking of the circumferential interconnection of the elements of at least one tube segment concerned of the articulated tube is ensured both by the manner of interlocking of the longitudinal interconnection of the tube segment concerned with a tube segment of the articulated tube situated in the longitudinal direction on one side thereof, and by the manner of interlocking of the longitudinal interconnection of the tube segment concerned with a tube segment of the articulated tube situated in the longitudinal direction on the other side thereof, wherein the respective manners of interlocking are also part of, respectively, ensuring the locking of the circumferential interconnection of the elements of the tube segment situated on the one side, and ensuring the locking of the circumferential interconnection of the elements of the tube segment situated on the other side.

In an articulated tube (bend restrictor) thus formed with such elements according to the invention, the elements of a tube segment concerned are held together in the circumferential direction by the interlocking help of the similar elements from each of two adjacent tube segments of the tube segment concerned, while the elements of the tube segment concerned also contribute to the holding together in circumferential direction of the elements of each of the two adjacent tube segments. In this way, the bend restrictor formed by the elements is characterized by multiple interconnections between the elements with a very strong relative connection between the elements of the bend restrictor. The above-mentioned various great and strongly varying loads, from the inside and from the outside, to which the bend restrictor with its hinging tube segments is exposed in operation, are very well distributed over the different elements and per element very well spread out over different parts of the element.

All of this renders the articulated tube extremely reliable as a bend restrictor. By virtue of the strong relative connection between the elements and by virtue of the good load distributions, according to the invention a more favourable ratio between quality and cost price of a bend restrictor is possible than with the known bend restrictors. What is more, according to the invention, in principle, no threaded bolts and nuts or special (hooking) parts of the elements are necessary to fasten together the elements of a tube segment concerned, except, possibly, at just the last tube segment of the bend restrictor. Not only does this have a further favourable influence on the cost price of the bend restrictor, but it also makes installing the bend restrictor easier.

In principle, the element can be manufactured from various materials. Preferably, the element is manufactured from plastic, for instance, with the aid of moulding or injection moulding in a mould. A suitable material for manufacture of the element is, for example, a Polyurethane.

In a preferred embodiment of the invention, the element is configured such that the tube segment concerned, the tube segment situated on the one side and the tube segment situated on the other side each comprise a mutually similar first portion, a mutually similar second portion, and a mutually similar third portion, the manner of interlocking of the longitudinal interconnection of the tube segment concerned with the tube segment situated on the one side is realized in that at least the first portion of the tube segment concerned is enveloped all around by the tube segment situated on the one side, and the manner of interlocking of the longitudinal interconnection of the tube segment concerned with the tube segment situated on the other side is realized in that at least the second portion of the tube segment concerned is enveloped all around by the third portion of the tube segment situated on the other side.

With such envelopments of the first portion and of the second portion of the tube segment concerned, the respective manners of interlocking are realized in a reliable manner.

Preferably, the element is configured such that the manner of interlocking of the longitudinal interconnection of the tube segment concerned with the tube segment situated on the one side is realized in that the second portion of the tube segment situated on the one side envelops the first portion of the tube segment concerned all around and also is enveloped all around by the third portion of the tube segment concerned, and the manner of interlocking of the longitudinal interconnection of the tube segment concerned with the tube segment situated on the other side is realized in that the second portion of the tube segment concerned envelops the first portion of the tube segment situated on the other side all around and also is enveloped all around by the third portion of the tube segment situated on the other side.

By virtue of such manners of interlocking, easy fitting of the articulated tube is further promoted. In fact, when fitting an element of a tube segment which is yet to be formed therewith, the element, by its portion corresponding with the second portion of the tube segment to be formed therewith, can easily and reliably be brought and positioned between the first portion and the third portion of a tube segment already formed all around the conduit.

In a further preferred embodiment of the invention, the element is configured such that the locked interlocking longitudinal interconnection of the tube segments is realized by interlocking of at least radially (i.e., in radial direction), seen relative to the conduit, receding portions and projecting portions, respectively, of two respective interconnected tube segments.

In a further preferred embodiment of the invention, the element is configured such that elements adjoining each other in the longitudinal direction of two mutually adjacent tube segments of the articulated tube are not in line with each other in the longitudinal direction, in that they are situated staggeredly with respect to each other in the circumferential direction, and the staggered situation is maintained in that the element comprises blocking means which at least partly block mutual relative rotation in the circumferential direction of the elements adjoining each other.

Such a locked staggered situation of the elements promotes the strong relative connection between the elements and the good load distributions still further. In this way, the relative connection is even so strong that in the hypothetical case where an individual element of a fitted articulated tube were lacking, the function of the articulated tube remains intact by virtue of the mutual interlocks of the elements around the place of the lacking element.

In the following, the invention is further elucidated with reference to the schematic figures in the appended drawings.

BRIEF DESCRIPTION OF THE DRAWINGS

FIG. 7 shows a view in cross section (partly in transparent view) taken along the line VII-VII denoted by arrows in FIG. 4.

FIG. 8 shows a part of a view in longitudinal section (partly in transparent view) along the line VIII-VIII denoted by arrows in FIG. 6.

DETAILED DESCRIPTION OF PREFERRED EMBODIMENTS OF THE INVENTION

Figure 4:
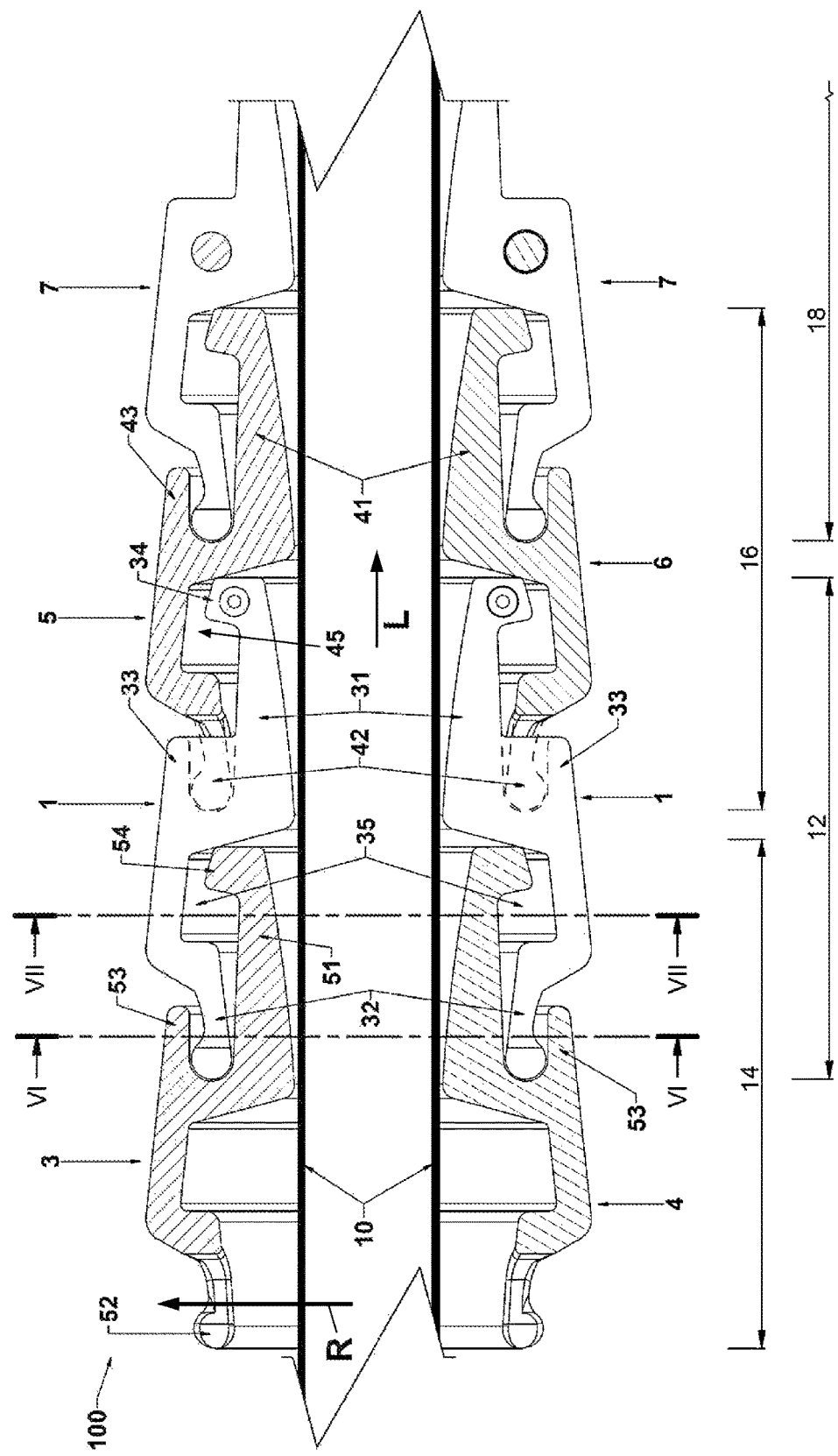
FIG. 4 shows a central longitudinal section (partly in transparent view) through a longitudinal portion of an articulated tube formed with several specimens of the element of FIG. 1 around a conduit, with the conduit at the longitudinal portion shown being in straight, i.e., unbent, condition. It is noted that FIG. 4 is a view taken along the line IV-IV denoted by arrows in FIGS. 6 and 7.
Figure 5:
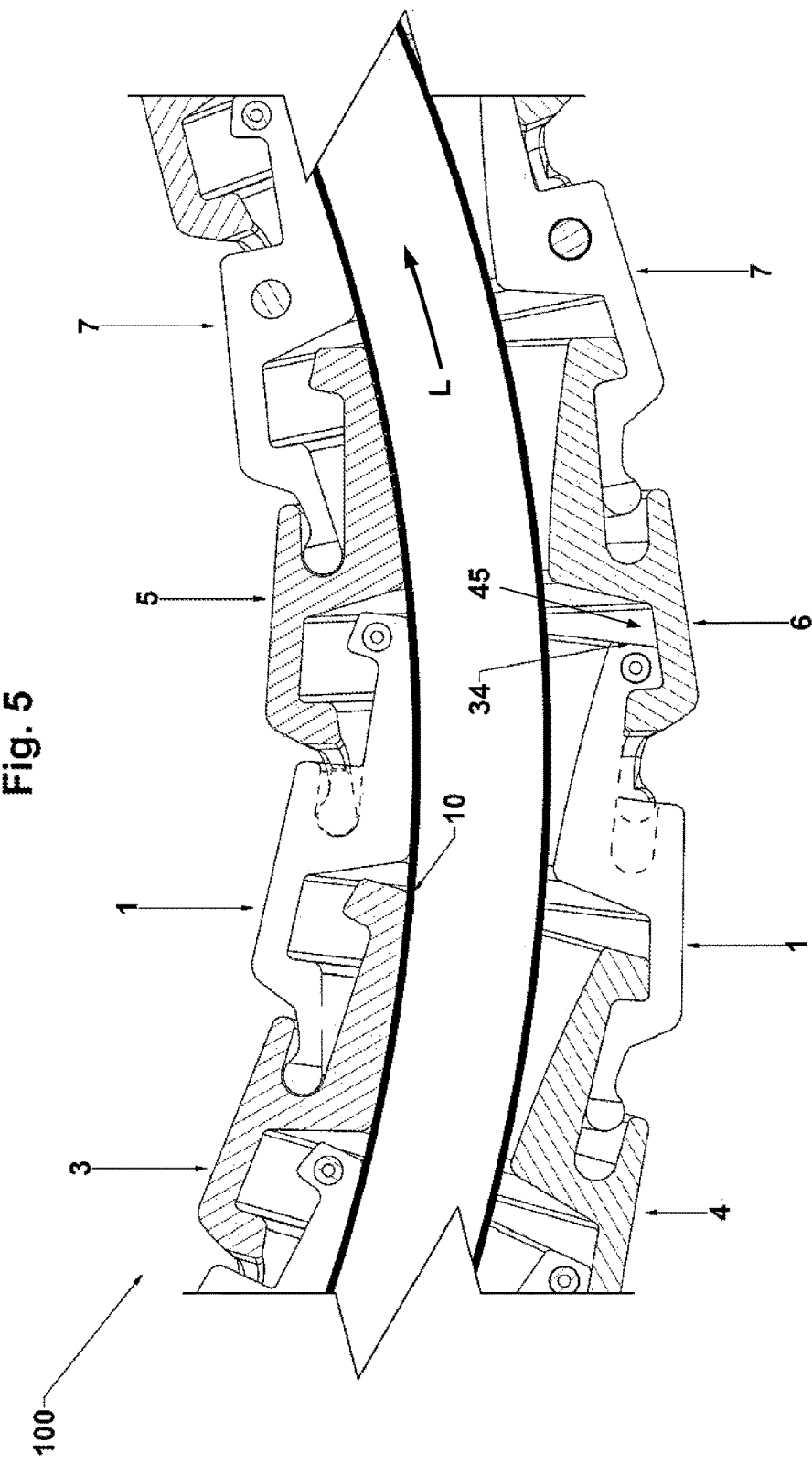
FIG. 5 shows the construction of FIG. 4 again, but in a condition in which the conduit at the longitudinal portion shown is in a bent condition.
Figure 6:
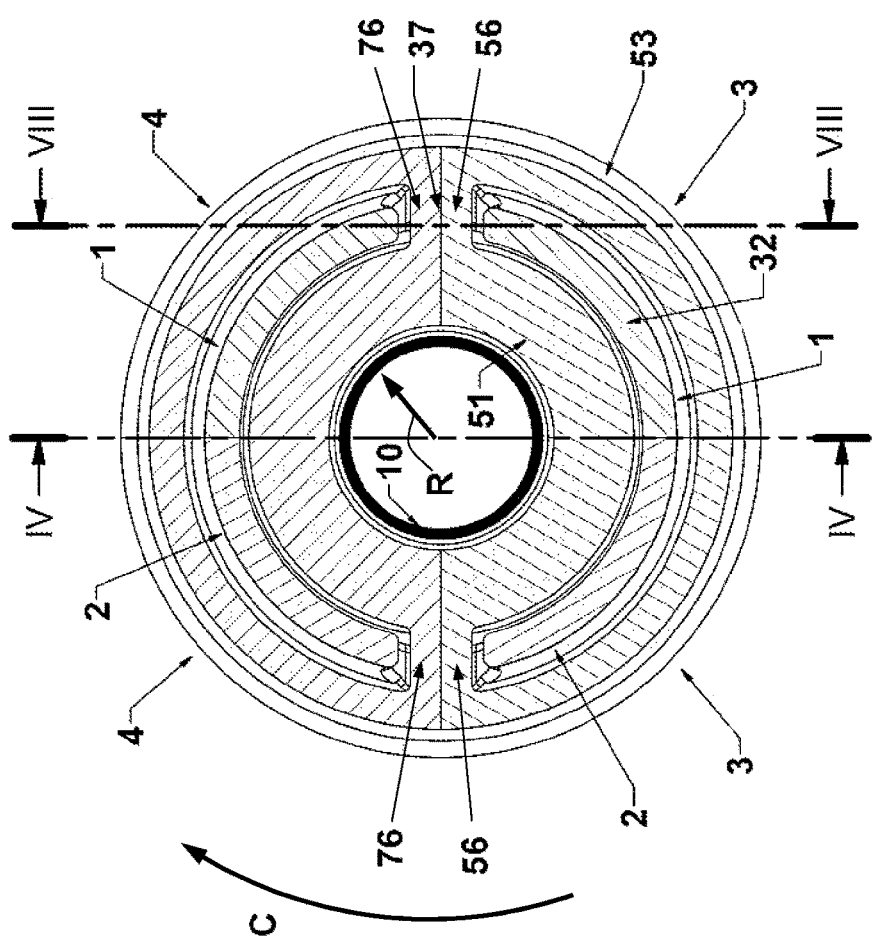
FIG. 6 shows a view in cross section (partly in transparent view) taken along the line VI-VI denoted by arrows in FIG. 4. It is noted that FIG. 6 is also a view taken along the line VI-VI denoted by arrows in FIG. 8.

The FIGS. 1 through 8 show a bend restriction element 1 according to the invention. In FIGS. 3 through 8, besides the element 1, additional, identical specimens 2 through 7 of the element 1 are shown. In FIGS. 4 through 7, further, a bendable conduit 10, such as, for example, an (underwater) pipeline, cable, or the like, is shown. In FIGS. 4 through 6, a longitudinal direction L of the conduit 10, a circumferential direction C of the conduit 10, and a radial direction R, seen relative to the conduit 10, are denoted.

Arranged around the depicted portion of the conduit 10 is an articulated tube 100. The articulated tube comprises the tube segments denoted in FIG. 4 with reference numerals 12, 14, 16, and 18, which are interconnected together in the longitudinal direction L in a mutually locked interlocking manner.

Each of the tube segments 12, 14, 16, and 18 is formed by different specimens of the element 1 being interconnected in the circumferential direction C in a mutually locked interlocking manner. The tube segment 12 is formed by the elements 1 and 2, the tube segment 14 by the elements 3 and 4, and the tube segment 16 by the elements 5 and 6.

The tube segments 12, 14, 16, and 18 of the tube 100 can hinge relative to each other about lines which are transverse to the longitudinal direction L of the conduit, whereby the hinging range of the hinging of the tube segments 12, 14, 16, and 18 is restricted for restricting the bending range of the conduit 10. Thus, in the depicted example of FIGS. 4 and 5, the hinged conditions of the tube segments 12, 14, 16, and 18 shown in FIG. 5 corresponding to the bent condition of the conduit 10 shown in FIG. 5, have been obtained, starting from the hinge conditions of the tube segments 12, 14, 16, and 18 corresponding to the straight condition of the conduit 10 shown in FIG. 4, by hinging of the tube segments 12, 14, 16, and 18 relative to each other in each case in the same hinging direction about lines which are perpendicular to the central longitudinal sectional plane. The hinged conditions of the tube segments 12, 14, 16, and 18 shown in FIG. 5 here correspond to the upper limit of the restricted bending range of the conduit 10 in the hinging direction mentioned.

In the example shown, each of the elements 1 through 7 is configured such that the locking of the circumferential interconnection of the two elements concerned of the tube segment concerned of the tube 100 is ensured both by the manner of interlocking of the longitudinal interconnection of the tube segment concerned with a tube segment 16 of the articulated tube situated in the longitudinal direction L on one side thereof, and by the manner of interlocking of the longitudinal interconnection of the tube segment concerned with a tube segment of the tube 100 situated in the longitudinal direction L on the other side thereof, while the respective manners of interlocking are also part of, respectively, ensuring the locking of the circumferential interconnection of the two elements of the tube segment situated on the one side, and ensuring the locking of the circumferential interconnection of the two elements of the tube segment situated on the other side.

Hence this holds for, among others, the elements of the tube segment concerned 12, of the tube segment 16 situated on one side thereof, and of the tube segment 14 situated on the other side thereof. The locking of the circumferential interconnection of the two elements 1 and 2 of the tube segment 12 is ensured both by the manner of interlocking of the longitudinal interconnection of the tube segment 12 with the tube segment 16, and by the manner of interlocking of the longitudinal interconnection of the tube segment 12 with the tube segment 14. Also, the respective manners of interlocking are part of, respectively, ensuring the locking of the circumferential interconnection of the two elements 5 and 6 of the tube segment 16, and ensuring the locking of the circumferential interconnection of the two elements 3 and 4 of the tube segment 14.

More particularly, in the example shown, each of the elements 1 through 7 is configured such that the tube segment concerned, the tube segment situated on the one side, and the tube segment situated on the other side each comprise a mutually similar first portion, a mutually similar second portion, and a mutually similar third portion, that the manner of interlocking of the longitudinal interconnection of the tube segment concerned with the tube segment situated on the one side is realized in that at least the first portion of the tube segment concerned is enveloped all around by the tube segment situated on the one side, and that the manner of interlocking of the longitudinal interconnection of the tube segment concerned with the tube segment situated on the other side is realized in that at least the second portion of the tube segment concerned is enveloped all around by the third portion of the tube segment situated on the other side.

Hence this holds again for, among others, the elements of the tube segment concerned 12, of the tube segment 16 situated on one side thereof, and of the tube segment 14 situated on the other side thereof. These respective tube segments 12, 16, and 14 each comprise such a first portion, respectively denoted with the reference numerals 31, 41, and 51, such a second portion, respectively denoted with the reference numerals 32, 42, and 52, and such a third portion, respectively denoted with the reference numerals 33, 43, and 53. In FIG. 4 it can be seen, for instance, that the first portion 31 of the tube segment 12 is enveloped all around by the tube segment 16, and that at least the second portion 32 of the tube segment 12 is enveloped all around by the third portion 53 of the tube segment 14. Also, it can be seen in FIG. 4, for instance, that the first portion 41 of the tube segment 16 is enveloped all around by the tube segment 18, and that at least the second portion 42 of the tube segment 16 is enveloped all around by the third portion 33 of the tube segment 12.

More particularly, in the example shown, each of the elements 1 through 7 is configured such that the manner of interlocking of the longitudinal interconnection of the tube segment concerned with the tube segment situated on the one side is realized in that the second portion of the tube segment situated on the one side envelops the first portion of the tube segment concerned all around and also is enveloped all around by the third portion of the tube segment concerned, and that the manner of interlocking of the longitudinal interconnection of the tube segment concerned with the tube segment situated on the other side is realized in that the second portion of the tube segment concerned envelops the first portion of the tube segment situated on the other side all around and also is enveloped all around by the third portion of the tube segment situated on the other side.

Hence this holds again for, among others, the elements of the tube segment concerned 12, of the tube segment 16 situated on the one side thereof, and of the tube segment 14 situated on the other side thereof. The manner of interlocking of the longitudinal interconnection of the tube segment 12 with the tube segment 16 is realized in that the second portion 42 of the tube segment 16 envelops the first portion 31 of the tube segment 12 all around and also is enveloped all around by the third portion 33 of the tube segment 12, and the manner of interlocking of the longitudinal interconnection of the tube segment 12 with the tube segment 14 is realized in that the second portion 32 of the tube segment 12 envelops the first portion 51 of the tube segment 14 all around and also is enveloped all around by the third portion 53 of the tube segment 14.

In the example shown, each of the elements 1 through 7 is configured such that the locked interlocking longitudinal interconnection of the tube segments is realized by interlocking of at least radially (i.e., in radial direction R) receding portions and projecting portions, respectively, of two respective interconnected tube segments.

Hence this holds again for, among others, the elements of the tube segment concerned 12, of the tube segment 16 situated on the one side thereof, and of the tube segment 14 situated on the other side thereof. In FIG. 4, it can be seen, for instance, that the locked interlocking longitudinal interconnection of the tube segments 12 and 14 is realized by interlocking of the portions 35 of the tube segment 12 receding in the radial direction R and the portions 54 of the tube segment 14 projecting in the radial direction R. Likewise, it can be seen in FIG. 4, for instance, that the locked interlocking longitudinal interconnection of the tube segments 16 and 12 is realized by interlocking of the portions 45 of the tube segment 16 receding in the radial direction R with the portions 34 of the tube segment 12 projecting in the radial direction R.

In the example shown, each of the elements 1 through 7 is configured such that elements adjoining each other in the longitudinal direction L of two mutually adjacent tube segments of the articulated tube are not in line with each other in the longitudinal direction L in that they are situated staggeredly with respect to each other in the circumferential direction C, and that the staggered situation is maintained in that the element comprises blocking means which at least partly block mutual relative rotation in the circumferential direction C of the elements adjoining each other.

Such blocking means for maintaining such locked staggered situation of the elements can be realized in various ways. For instance, they can be realized in that the element comprises grooves and ribs extending at least in the longitudinal direction L, which are so configured that the grooves of one element cooperatively interlock with the ribs of the element adjoining it in the longitudinal direction L.

How such blocking means are realized in the example shown appears from FIGS. 3, 4, 6, and 8, in which the locked staggered situation of, among others, the elements 1 and 3 is shown. The blocking means of the element 1 comprise the slot, denoted with reference numeral 37 in FIGS. 1, 6, and 8, in the part of the element 1 that corresponds with the second portion 32 of the tube segment 12, as well as the two transverse walls, denoted with reference numerals 36 in FIG. 1, between the wall of the element 1 corresponding with the first portion 31 of the tube segment 12 and the wall of the element 1 corresponding with the third portion 33 of the tube segment 12. For the element 3, the transverse walls, similar to the transverse walls 36, are denoted with reference numerals 56 in FIGS. 3, 6, and 8. For the element 4, the transverse walls, similar to the transverse walls 36, are denoted with reference numerals 76 in FIGS. 6 and 8. In FIGS. 6 and 8 it can be seen that one transverse wall 56 of the element 3 together with one transverse wall 76 of the element 4 extend in the slot 37 of the element 1. As a result, the relative rotation in circumferential direction C of the elements 1 and 3 adjoining each other in the longitudinal direction L, as well as of the elements 1 and 4 adjoining each other in the longitudinal direction L, is at least partly blocked.

Figure 1:
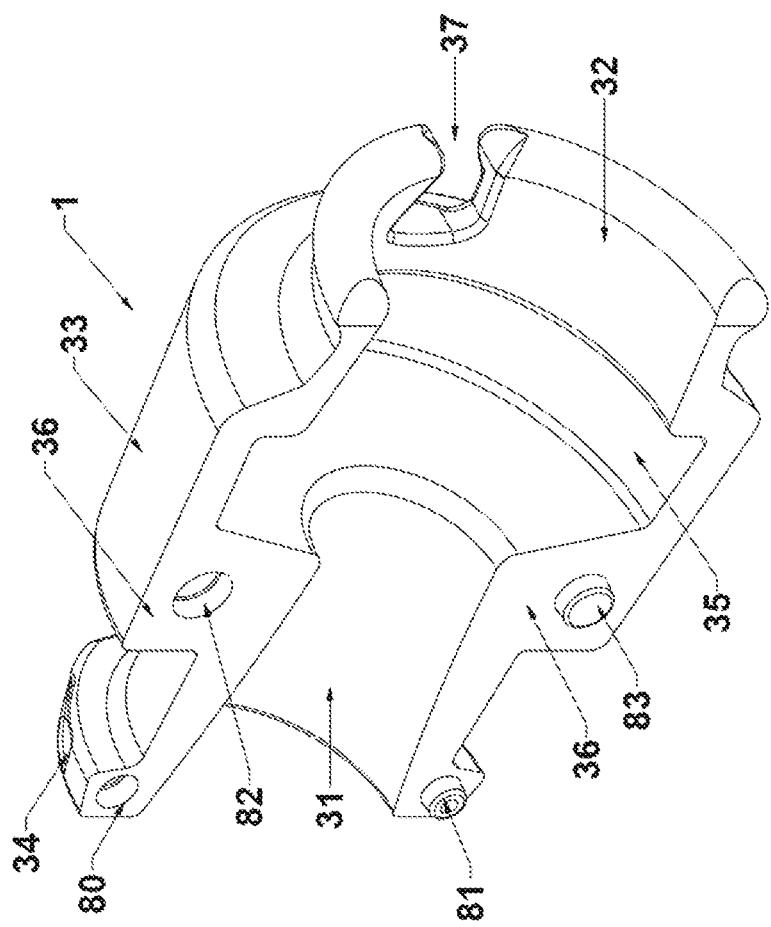
FIG. 1 shows in perspective an example of an embodiment of a bend restriction element according to the invention.
Figure 2:
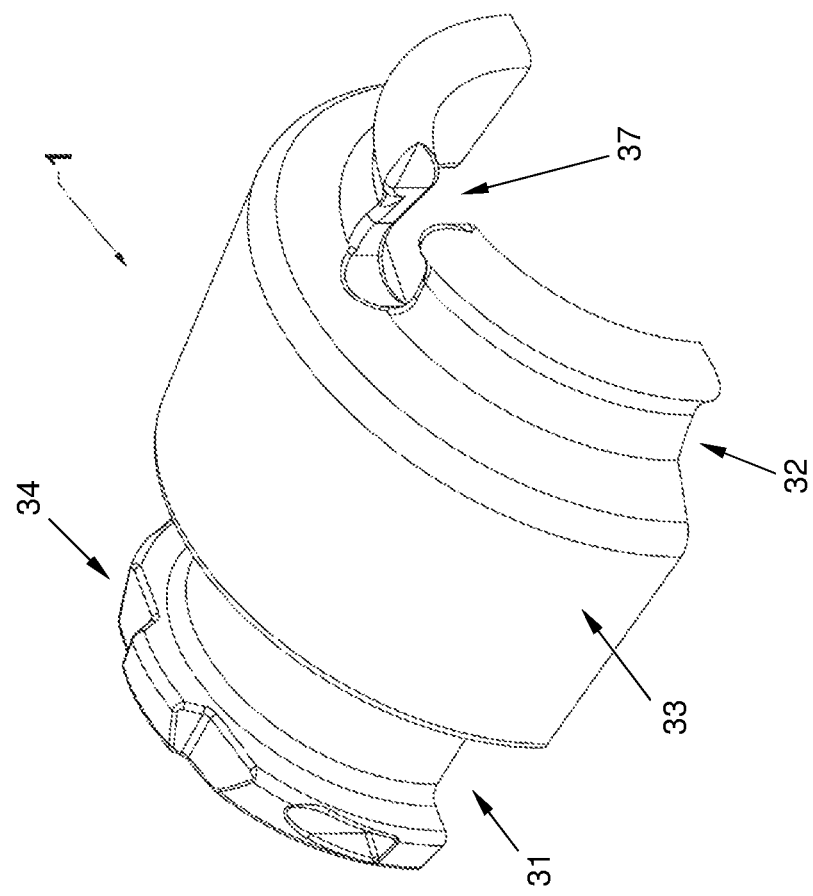
FIG. 2 shows the element of FIG. 1 in another perspective view.
Figure 3:
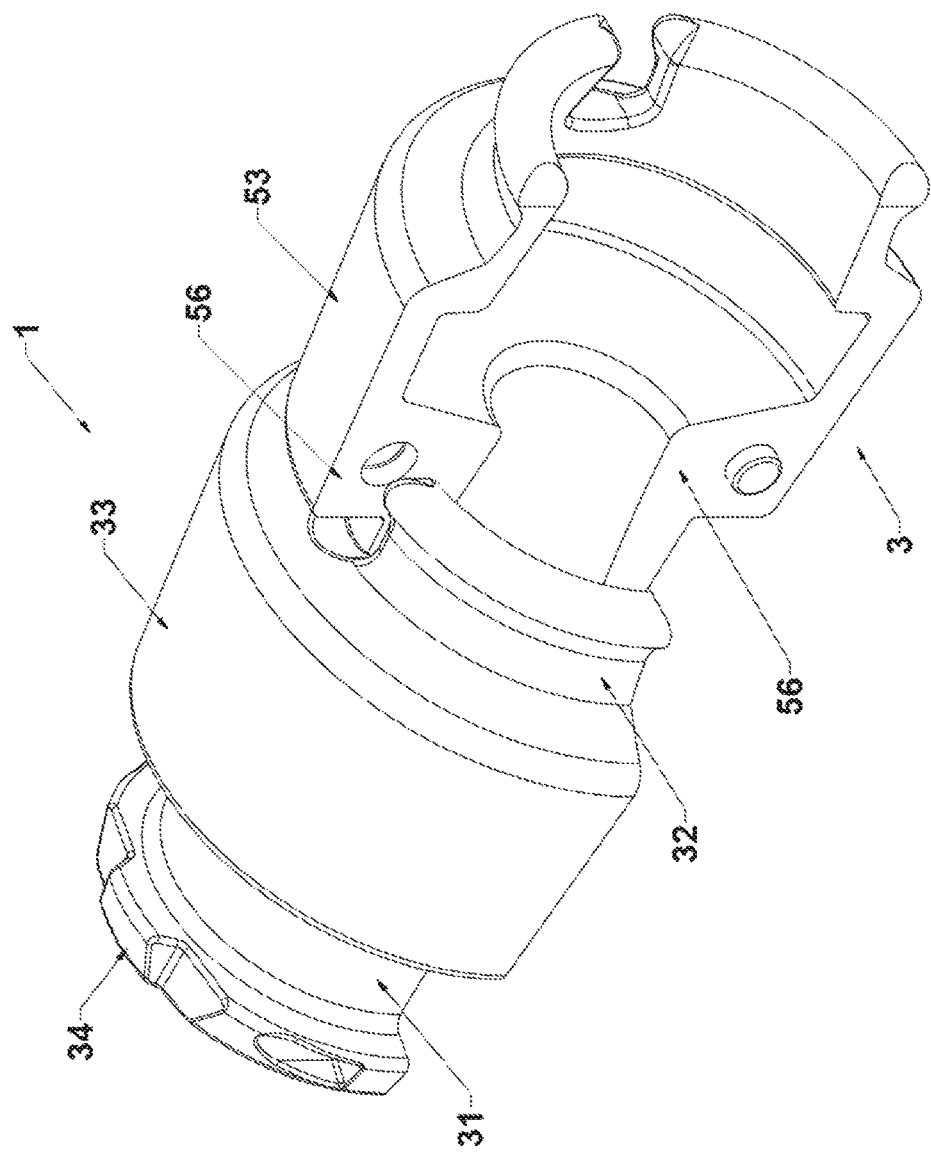
FIG. 3 shows in perspective two specimens of the element of FIG. 1 in a manner in which they can be longitudinally interconnected for use in an articulated tube.

Referring to FIG. 1, the following optional aspects of the element 1 are elucidated here. In FIG. 1 it can be seen that the element 1, on its side that is intended, within a tube segment of the articulated tube, to abut against a similar side of another such element, is provided with the recesses 80 and 82, as well as with the protrusions 81 and 83. These recesses and protrusions facilitate the assembly of the articulated tube in that the protrusions 81 and 83 of the element 1 can be positioned in the recesses, similar to the recesses 80 and 82, of the other element of the tube segment concerned. In the example shown, the recess 80 and the protrusion 81 are provided with passages. If desired, threaded bolts can be introduced into those passages, so that the element 1, with those threaded bolts and associated nuts, can be firmly fixed to the other element of the tube segment concerned. Such a threaded bolt fastening may, for instance, be applied only with the last tube segment of a bend restrictor.

It is noted that the above-mentioned examples of embodiments do not limit the invention and that various alternatives are possible.

Thus, for instance, diverse variations are possible in the shapes, dimensions and materials of the element according to the invention.

With the element according to the invention shown in the figures, a tube segment is formed through a circumferential interconnection of two such elements. Instead, an alternative bend restriction element according to the invention may also be modular for forming a tube segment by circumferential interconnection of three or more such alternative elements. The greater the number of elements per tube segment of an articulated tube, the stronger the connection between the elements of the tube will be in the hypothetical case where the articulated tube were to lose an individual element as a result of damage, and the better the function concerning the restriction of the hinging range of the hinging of the tube segments remains intact despite a thus lost individual element.

In the example shown in the figures, an articulated tube is formed through interconnections of mutually identical specimens of elements according to the invention. Instead, however, it is also possible that an articulated tube is formed by interconnections of mutually (in shape) different specimens of elements according to the invention. Also, it is possible that at least one element according to the invention is interconnected together with at least one element of a different kind, not according to the invention, for forming an articulated tube.

These and similar alternatives are understood to fall within the scope of the invention as defined in the appended claims.

The invention claimed is:

1. An articulated tube for restricting a bending range of a conduit, comprising at least three tube segments, wherein adjacent tube segments are engaged in a longitudinal direction, each tube segment comprising at least two bend restriction elements engaged in a circumferential direction, wherein each of said bend restriction elements restricts the bending range of the conduit, wherein each of said at least two bend restriction elements is modular for forming each of said at least three tube segments all around the conduit through locked interlocking circumferential interconnection, of the at least two bend restriction elements, wherein each of said at least three tube segments is modular for forming said articulated tube all around the conduit through locked interlocking longitudinal interconnection, of said at least three tube segments, wherein said at least three tube segments of the articulated tube are configured to hinge in a hinging range relative to each other about lines which are transverse to said longitudinal direction of the conduit, wherein the hinging range of said hinge of the at least three tube segments is restricted for said restricting of the bending range of the conduit, wherein said circumferential interconnection of the at least two bend restriction elements is ensured both by the manner of interlocking of the longitudinal interconnection of a tube segment concerned with a tube segment of the articulated tube situated in the longitudinal direction on one side thereof, and by the manner of interlocking of the longitudinal interconnection of the tube segment concerned with a tube segment of the articulated tube situated in the longitudinal direction on the other side thereof, wherein said respective manners of interlocking are also part of, respectively, ensuring said circumferential interconnection of the at least two bend restriction elements of the tube segment situated on said one side, and ensuring said circumferential interconnection of the at least two bend restriction elements of the tube segment situated on said other side, and wherein each of said at least two bend restriction elements is configured such that:

bend restriction elements, adjoining each other in the longitudinal direction, of two mutually adjacent tube segments are rotationally shifted with respect to each other in said circumferential direction, and each of said at least two bend restriction elements comprises blocking means which at least partly block mutual relative rotation in said circumferential direction of said bend restriction elements, adjoining each other in said longitudinal direction, wherein each of said at least two bend restriction elements is configured such that the tube segment concerned, the tube segment situated on said one side, and the tube segment situated on said other side each comprise a mutually similar first portion, a mutually similar second portion, and a mutually similar third portion, said manner of interlocking of the longitudinal interconnection of the tube segment concerned with the tube segment situated on said one side is realized in that at least the first portion of the tube segment concerned is enveloped all around by the tube segment situated on said one side, and said manner of interlocking of the longitudinal interconnection of the tube segment concerned with the tube segment situated on said other side is realized in that at least the second portion of the tube segment concerned is enveloped all round by the third portion of the tube segment situated on said other side.

2. The articulated tube according to claim 1, wherein each of said at least two bend restriction elements is configured such that said manner of interlocking of the longitudinal interconnection of the tube segment concerned with the tube segment situated on said one side is realized in that the second portion of the tube segment situated on said one side envelops the first portion of the tube segment concerned all around and also is enveloped all around by the third portion of the tube segment concerned, and said manner of interlocking of the longitudinal interconnection of the tube segment concerned with the tube segment situated on said other side is realized in that the second portion of the tube segment concerned envelops the first portion of the tube segment situated on said other side all around and also is enveloped all around by the third portion of the tube segment situated on said other side.

3. The articulated tube according to claim 1, wherein each of said at least two bend restriction elements is configured such that said locked interlocking longitudinal interconnection of the at least three tube segments is realized by interlocking of at least radially, seen relative to the conduit, receding portions and projecting portions, respectively, of two respective interconnected tube segments.

4. An articulated tube for restricting a bending range of a conduit, comprising tube segments, wherein adjacent tube segments are engaged in a longitudinal direction, each tube segment comprising bend restriction elements engaged in a circumferential direction, wherein each bend restriction element restricts the bending range of the conduit, wherein each tube segment is modular for forming an articulated tube around the conduit through locked interlocking longitudinal interconnection of adjacent tube segments, wherein adjacent tube segments are configured to hinge in a hinging range relative to each other about lines which are transverse to said longitudinal direction of the conduit, wherein the hinging range of said hinging of the tube segments is restricted for said restricting of the bending range of the conduit, wherein bend restriction elements adjoining each other in the longitudinal direction of two mutually adjacent tube segments are rotationally shifted with respect to each other in said circumferential direction, and wherein a first bend restriction element comprises a first portion, a second portion and a third portion, the third portion being located between the first portion and the second portion, the second portion being a collar portion which extends longitudinally from the third portion, the second portion having a slot, the second portion and the slot being sized and configured such that, when a first portion of a second bend restriction element, the same as said first bend restriction element, is inserted longitudinally into the second portion of said first bend restriction element, a portion of the second bend restriction element extends into said slot and at least partly blocks relative circumferential rotation of the second bend restriction element with respect to said first bend restriction element.

5. An articulated tube comprising:

a first tube segment comprising a first bend restriction element and a second bend restriction element, a second tube segment comprising a third bend restriction element and a fourth bend restriction element, wherein the first tube segment and the second tube segment are adjacent to each other and engaged in a longitudinal direction, wherein the first bend restriction element and the second bend restriction element are engaged in a circumferential direction and a protrusion of the first bend restriction element is positioned in a recess of the second bend restriction element, wherein a transverse wall of the first bend restriction element and a transverse wall of the second bend restriction element extend into a slot of the third bend restriction element, and wherein the first bend restriction element and the third bend restriction element are rotationally shifted with respect to each other in said circumferential direction.

* * * * *